March 16, 1926.
O. E. HUEBNER
1,576,974
ELECTRIC STORAGE BATTERY
Filed May 16, 1923
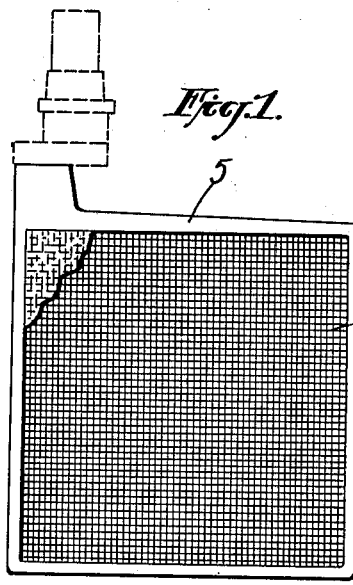
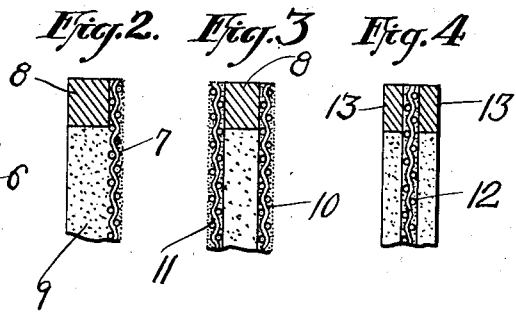
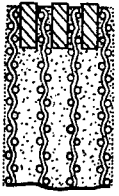
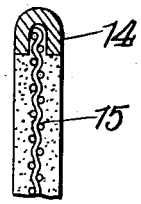
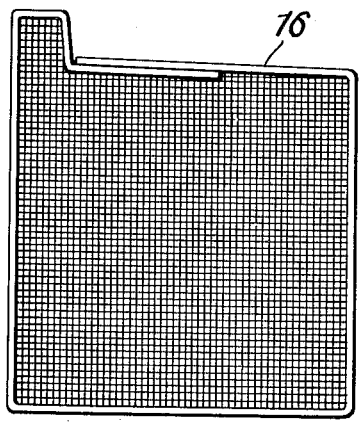
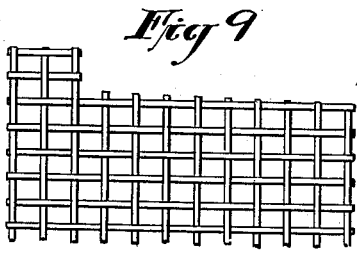
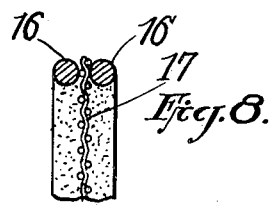
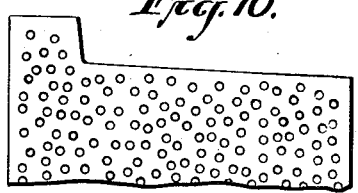
INVENTOR.
O. E. HUEBNER.
BY
Richard B. Owen
ATTORNEY.

Patented Mar. 16, 1926.

1,576,974

UNITED STATES PATENT OFFICE.

OTTO E. HUEBNER, OF FLUSHING, NEW YORK.

ELECTRIC STORAGE BATTERY.

Application filed May 16, 1923. Serial No. 639,408.

*To all whom it may concern:*

Be it known that I, OTTO E. HUEBNER, a citizen of the United States, residing at Flushing, in the county of Queens and State of New York, have invented certain new and useful Improvements in Electric Storage Batteries, of which the following is a specification.

This invention relates to electric storage batteries and more particularly to a novel and improved construction and substitute for the cast or moulded battery grid now in common use.

The primary object of my invention is to provide a battery built up of a plurality of lead covered, meshed sieves forming the base or body to which the active material adheres, and in which a greater surface is afforded in the use of a sieve-like construction as distinguished from cast grids of various thicknesses.

Another object of my invention is to provide a battery wherein a plurality of connected, lead covered, sieves of different material and mesh may be combined in single or multiple plate as utilized as grids to retain the active material of the battery in place and reduce the internal resistance and at the same time increase the strength and capacity of the battery.

A continued object of my invention is to provide a plurality of lead covered perforated sheet of material in the form of sieves perferably constructed of acid-proof metal, with or without separators which may be combined in single or multiple groups as grids and containers so as to afford an increased surface for the active material of the battery to reduce the internal resistance and at the same time increase its capacity and strength.

An additional object of my invention is to provide a battery of the character above specified wherein separators may be utilized said separators being preferably of a dielectric material, such as wood, paper, fibre, hard rubber or celluloid which is punctured or pierced by a high tension electrical discharge whereby the strength of the texture of the dielectric is not weakened and permits of the passage of the electrolyte in the battery.

I accomplish the above variously outlined objects which will be more fully understood and appreciated when taken in connection with the accompanying drawings constituting a part of this application and which illustrates various preferred embodiments of my invention and wherein:

Figure 1 is a view showing the frame and sieve in position.

Figure 2 is a sectional view showing the sieve attached to one side of the frame and which may be used as a grid.

Figure 3 shows the sieve attached to both sides of the frame.

Figure 4 is a view showing the sieve positioned in the center.

Figure 5 shows a plurality of connected frames and sieves.

Figure 6 is a modified form of a U-shaped frame for one of the sieves.

Figure 7 is a further modified form of a wire frame.

Figure 8 is a sectional view showing the relation of the sieves to the wire frame.

Figure 9 is a fragmentary view of a wire mesh which may be used as a grid without its frame.

Figure 10 is a detail fragmentary view of a separator.

In Figure 1, 5 designates the frame and 6, the sieve-like construction which may be mounted therein as a grid in various manners. In Figure 2, the sieve 7 is secured to one side of the frame 8, the active material or lead being indicated at 9. It is of course understood that the material of the sieve may be of different mesh and it is contemplated that different kinds of acid-proof metal may be used, for this purpose. Since the thickness of a meshed frame or screen is very much less than the conventional type of cast grids now being used, it will be seen that the greater surface is afforded for the active material. In Figure 3, the sieves or screens 10, 11, are disposed on each side of the frame 8 or the sieves as shown by numeral 12, may be disposed between the frames 13. While a single frame may be used as a grid, I also realize that a number of connected sieves as shown by Figure 5 may be employed, or a U-shaped frame 14 utilized to receive a sieve as indicated by numeral 15, of the drawings.

Instead of the frames above referred to, a double wire frame as indicated at 16, between which the sieve 17 is positioned, may be employed within the battery as a grid and where the material utilized is of sufficient thickness to eliminate the necessity of a frame and when a coarse mesh of the sieve is adopted, as shown by Figure 9, very good results are obtained.

The sieve-like construction of the character above set forth may be used with or without a separator and in those instances where a separator is used, the separator may be of wood, paper, fibre, hard rubber or celluloid, the same is preferably pierced and punctured indiscriminately throughout its surface by a high tensioned electrical discharge which, it has been found in practice, does not weaken the texture or strength of the material and permits the electrolyte to freely pass to the sieve.

While I have described my invention with some degree of particularity, I realize that in practice various alterations therein may be made, I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A separator for storage batteries comprising a sheet of material, having apertures pierced therethrough by high tension electrical discharges.

2. A separator for storage batteries comprising a thin sheet of material, having apertures pierced therethrough indiscriminately over its entire surface by high tension electrical discharges, the diameter of said apertures being of a size to permit the diffusion of water and a dilute acid.

3. A separator for storage batteries comprising a thin sheet of fibrous material having apertures pierced indiscriminately throughout its entire surface by high tension electrical discharges, said apertures being close together and of a size to permit only of the diffusion of water and dilute acid.

In testimony whereof I affix my signature.

OTTO E. HUEBNER. [L. S.]